(12) United States Patent
Deh

(10) Patent No.: US 11,413,977 B2
(45) Date of Patent: Aug. 16, 2022

(54) CHARGING ASSEMBLY FOR ELECTRIC VEHICLE

(71) Applicant: Dovene Komi Deh, Philadelphia, PA (US)

(72) Inventor: Dovene Komi Deh, Philadelphia, PA (US)

(\*) Notice: Subject to any disclaimer, the term of this patent is extended or adjusted under 35 U.S.C. 154(b) by 0 days.

(21) Appl. No.: 17/177,160

(22) Filed: Feb. 16, 2021

(65) Prior Publication Data

US 2021/0170894 A1 Jun. 10, 2021

Related U.S. Application Data

(60) Provisional application No. 63/124,461, filed on Dec. 11, 2020.

(51) Int. Cl.
| | |
|---|---|
| *H02J 7/00* | (2006.01) |
| *H02J 7/14* | (2006.01) |
| *B60L 53/31* | (2019.01) |
| *B60L 53/16* | (2019.01) |
| *B60L 53/60* | (2019.01) |
| *B60L 53/18* | (2019.01) |
| *B60L 53/30* | (2019.01) |
| *B60L 55/00* | (2019.01) |

(52) U.S. Cl.
CPC .............. *B60L 53/31* (2019.02); *B60L 53/16* (2019.02); *B60L 53/18* (2019.02); *B60L 53/305* (2019.02); *B60L 53/60* (2019.02); *B60L 55/00* (2019.02)

(58) Field of Classification Search
CPC ........ B60L 53/51; B60L 53/60; B60L 53/305; B60L 53/16; B60L 53/18; B60L 55/00
USPC ................................ 320/109, 107, 108, 134
See application file for complete search history.

(56) References Cited

U.S. PATENT DOCUMENTS

| | | | | |
|---|---|---|---|---|
| 9,061,597 | B2* | 6/2015 | Oda ......................... | B60L 53/11 |
| 2010/0013434 | A1* | 1/2010 | Taylor-Haw ......... | G06Q 20/127 |
| | | | | 320/109 |
| 2010/0013436 | A1* | 1/2010 | Lowenthal .............. | B60L 53/14 |
| | | | | 320/109 |
| 2010/0283426 | A1* | 11/2010 | Redmann .................. | B60L 3/04 |
| | | | | 320/109 |
| 2011/0074351 | A1* | 3/2011 | Bianco .................. | G07F 15/005 |
| | | | | 320/109 |
| 2012/0091961 | A1* | 4/2012 | Hani ..................... | B60L 3/0069 |
| | | | | 320/109 |
| 2013/0069588 | A1* | 3/2013 | Oda ........................ | B60L 53/18 |
| | | | | 320/109 |
| 2013/0268433 | A1* | 10/2013 | Viner ...................... | B60L 53/14 |
| | | | | 705/40 |

(Continued)

*Primary Examiner* — Alexis B Pacheco
(74) *Attorney, Agent, or Firm* — Barry Choobin; Patent 360

(57) ABSTRACT

A charging assembly for an electric vehicle that can be mounted on a public utility pole, such as an electricity pole. The charging assembly includes a housing enclosing a charging circuitry and a control unit. The charging circuitry is electrically connected to a power supply and an electric cord for charging the electric vehicle. The control unit includes a network circuitry for creating a network over which a user device can connect to interact with the charging assembly through an interface provided on the user device. The charging assembly further includes a beacon, a dome camera, a display panel, and a series of indicators for showing the progress of the charging.

4 Claims, 4 Drawing Sheets

(56) References Cited

U.S. PATENT DOCUMENTS

| | | | |
|---|---|---|---|
| 2013/0307477 A1* | 11/2013 | Reinschke | B60L 11/1824 |
| | | | 320/109 |
| 2013/0320921 A1* | 12/2013 | Muller | B60L 53/14 |
| | | | 320/109 |
| 2015/0077239 A1* | 3/2015 | Litjen | H02J 7/0047 |
| | | | 320/109 |
| 2015/0298564 A1* | 10/2015 | Johansson | B60L 53/63 |
| | | | 320/109 |
| 2017/0237944 A1* | 8/2017 | Haas | G06Q 20/14 |
| | | | 348/143 |
| 2019/0047430 A1* | 2/2019 | Gotz | B60L 53/14 |
| 2019/0118671 A1* | 4/2019 | Helnerus | B60L 53/16 |
| 2020/0016992 A1* | 1/2020 | Kohler | G06Q 20/145 |
| 2020/0127470 A1* | 4/2020 | Botts | B60L 58/12 |
| 2020/0130643 A1* | 4/2020 | Bode | H04W 4/80 |
| 2020/0262305 A1* | 8/2020 | Chakraborty | G06Q 20/40155 |
| 2020/0369167 A1* | 11/2020 | Krucinski | B60L 53/16 |

* cited by examiner

CHARGING ASSEMBLY FOR ELECTRIC VEHICLE

CROSS-REFERENCE TO RELATED APPLICATIONS

This application claims priority to the U.S. provisional patent application Ser. No. filed 63/124,461, filed on Dec. 11, 2020, which is incorporated herein by reference in its entirety.

FIELD OF INVENTION

The present invention relates to an assembly for charging electric vehicles, and more particularly, the present invention relates to a modular and network-controlled charging assembly and method of use thereof.

BACKGROUND

The term electric vehicle refers to automobiles driven by electric motors utilizing the energy stored in batteries. The use of electric vehicles is on the rise in recent years because these are non-polluting, and the operational costs are much lesser than fuel-based automobiles. Additionally, oil fossil fuel reserves are depleting faster, and it is estimated that oil deposits may rut out in the next 50 years. Because of these reasons, environmental and government agencies are also promoting the use of electric vehicles. Thus, an exponential rise in the use of electric vehicles will continue.

However, the major disadvantage with electric vehicles is the charging of the battery is a time-consuming process. Recent improvements in battery technology, such as larger capacity and fast charging aided the popularity of electric vehicles, but still, an average electric vehicle may take a few hours to charge. On a single charge, known electric vehicles can cover 100-180 miles. Thus, frequent recharging is another shortcoming of the electric vehicle.

Thus, considering the exponential rise in the use of electric vehicles, an urgent need is there for economic and user-friendly charging stations for electric vehicles.

SUMMARY

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a charging assembly for electric vehicles that is economical.

It is another object of the present invention that the charging assembly is easily accessible to the electric vehicles.

It is still another object of the present invention that a wide network of the charging assembles can be made available with lesser cost.

It is yet another object of the present invention that any overload on the grid can be prevented.

In one aspect, disclosed is a charging assembly that can be installed on an electric pole and receives power through the grid. The charging assembly includes a universal electric vehicle charger connected through a long electric cord. The charging assembly includes a housing that can be mounted on the electric pole. On top of the housing can be a light beacon that is visible from a long distance.

In one aspect, disclosed is application software (app) that may allow a user to interact with the charging assembly for charging an electric vehicle. The app allows a user to locate and navigate to the charging stations, start, and stop the charging of the electric vehicle, and make payments. The application software may be connected to the wireless local area network of the charging assembly or can also connect through a WAN, such as the internet.

These and other objects and advantages of the embodiments herein will become readily apparent from the following detailed description taken in conjunction with the accompanying drawings.

BRIEF DESCRIPTION OF DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
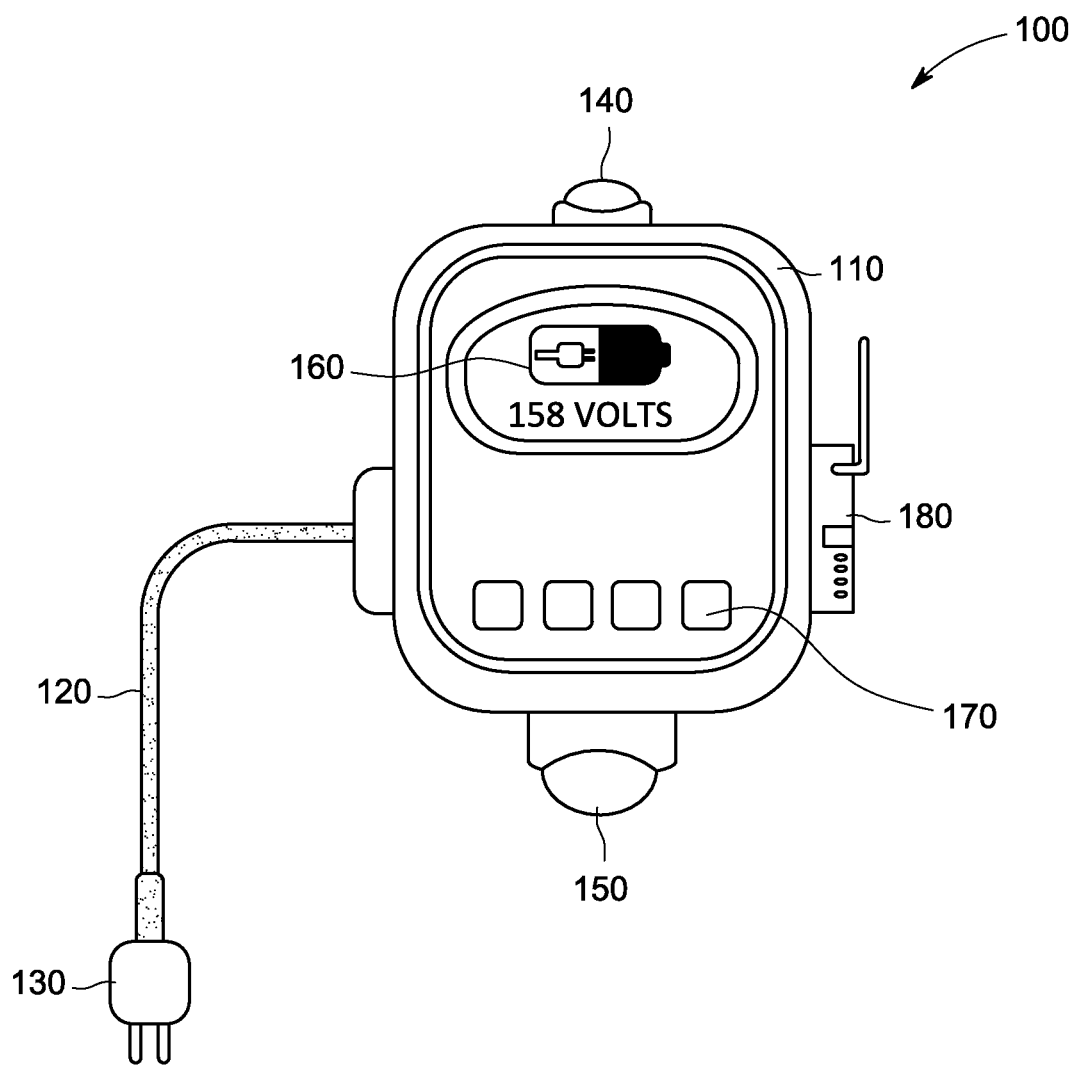
FIG. 1 is a perspective view of a charging assembly for electric vehicles, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a charging assembly that can mount on utility poles. Utility poles, including the electric poles, support the overhead power lines, transformers, street lighting, and other public utilities. Utility poles are in good numbers in localities, along the roads, and in public areas. Space is generally available alongside the utility poles for an automobile to be parked. Also, in many places, the automobiles can be seen parked on the roadside. Thus, the disclosed charging assembly on electric poles does not require bigger charging stations resulting in decreased installation and operational costs. Moreover, such poles in the public areas and along roadsides are easily accessible. Also, the disclosed charging assembly on electric poles can be easily located, for example on the way alongside the road.

Referring to FIG. 1, which shows an exemplary embodiment of the disclosed charging assembly 100 having a housing 110. The housing encases different components of the disclosed charging assembly and can also have suitable brackets for mounting the disclosed charging assembly to the utility pole. A charging cord 120 and a charging plug 130 can be seen extending from the housing 110. On top of the housing 110 can be a beacon 140, and on the bottom of the housing can be a dome camera 150. On the front side of the housing 110 can be seen a display panel 160 and below the display panel 160 can be a series of indicators 170. On the right of housing 110 can be a network circuitry 180.

Figure 2:
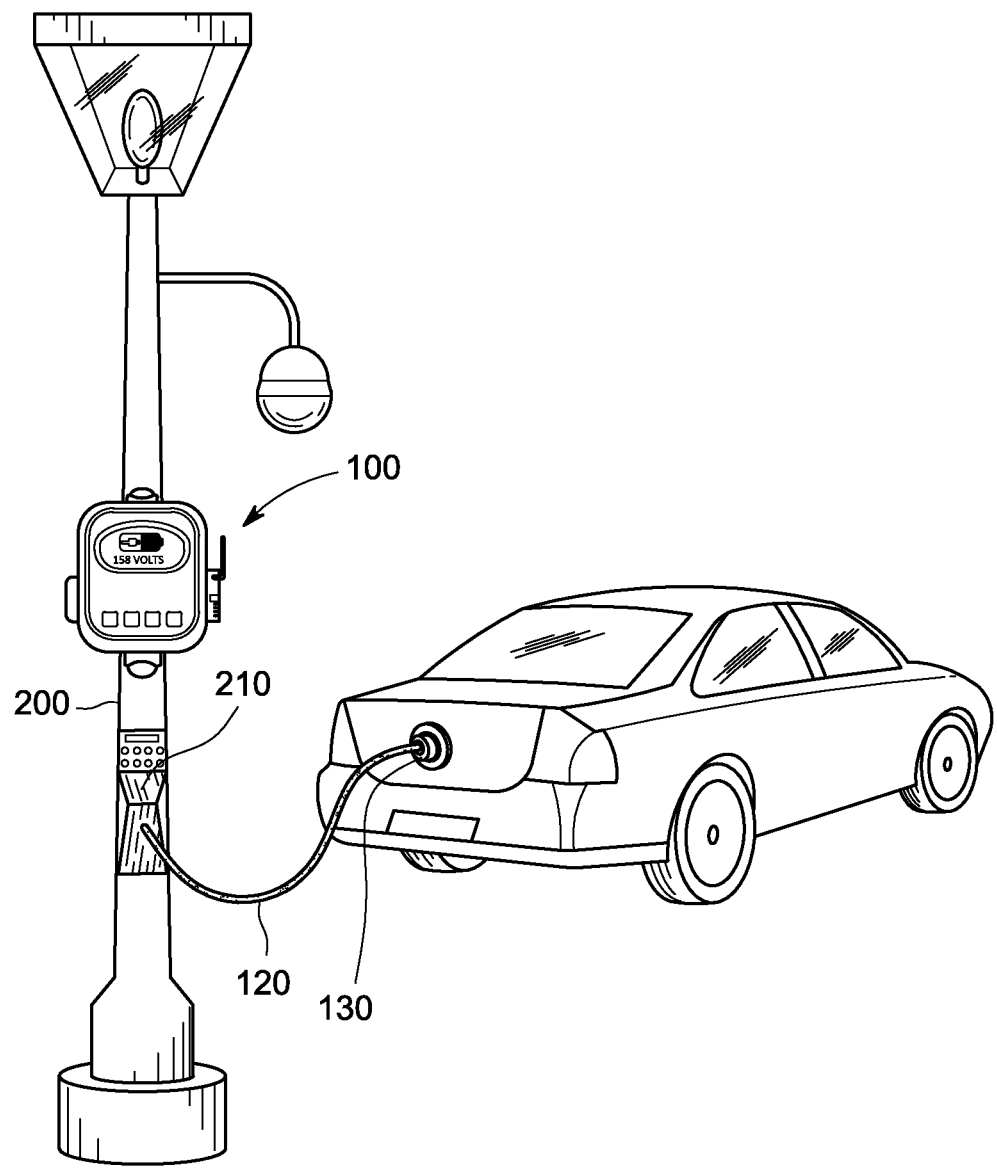
FIG. 2 shows charging of an electric vehicle, wherein charging cord is passed through a utility pole, according to an exemplary embodiment of the present invention.
Figure 3:
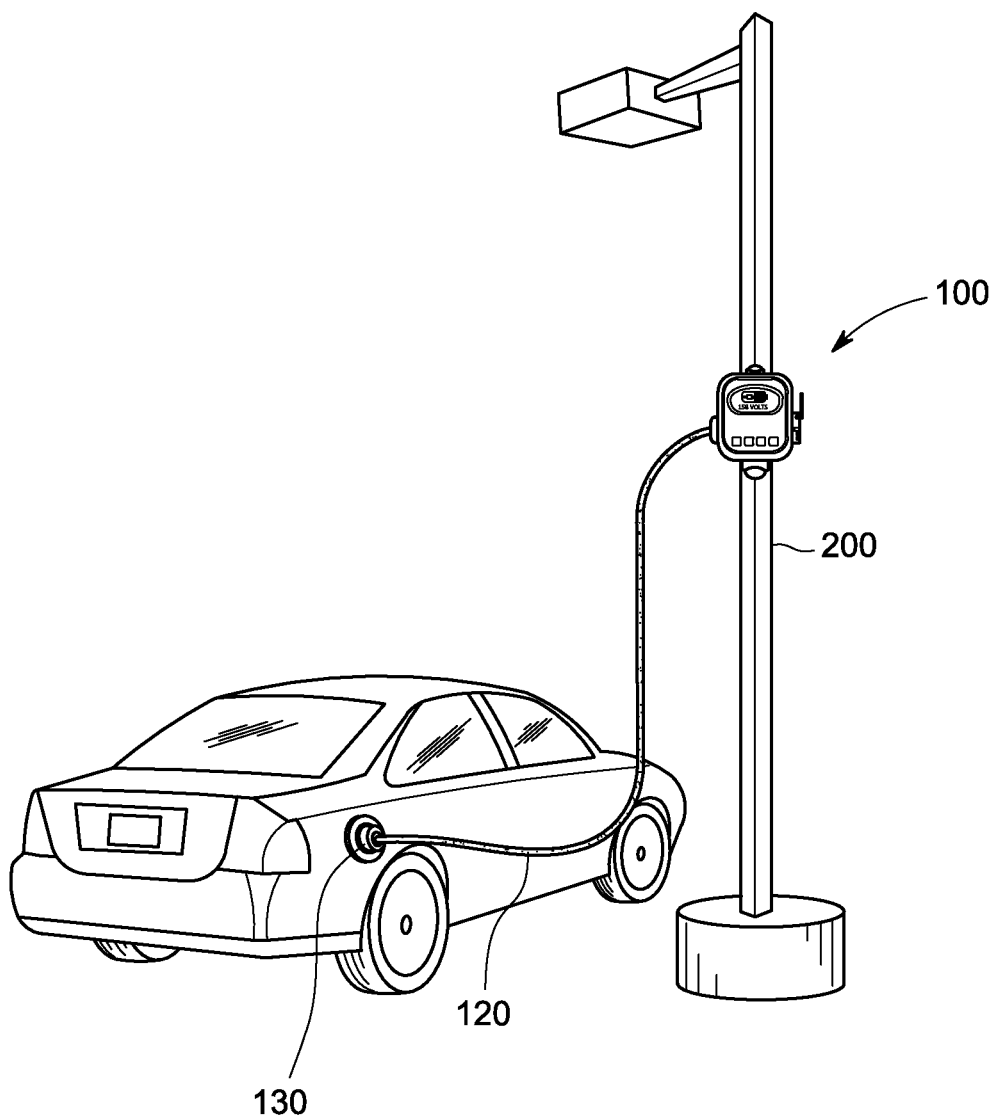
FIG. 3 shows the charging cord from the charging assembly connected to an electric vehicle, wherein the electric code is suspended in the air, according to an exemplary embodiment of the present invention.

Referring to FIG. 2 which shows the disclosed charging assembly 100 mounted on a utility pole 200. Also, FIG. 2 shows a panel 210 coupled to the utility pole 200 and the charging cord 120 is extending out from the panel 210. Furthermore, FIG. 2 also shows the plug 130 connected to an electric vehicle for charging its batteries. FIG. 3 shows an alternate embodiment of the disclosed charging assembly in which the charging cord does not goes through the utility pole but suspended in the air from the charging assembly mounted on the utility pole.

Figure 4:
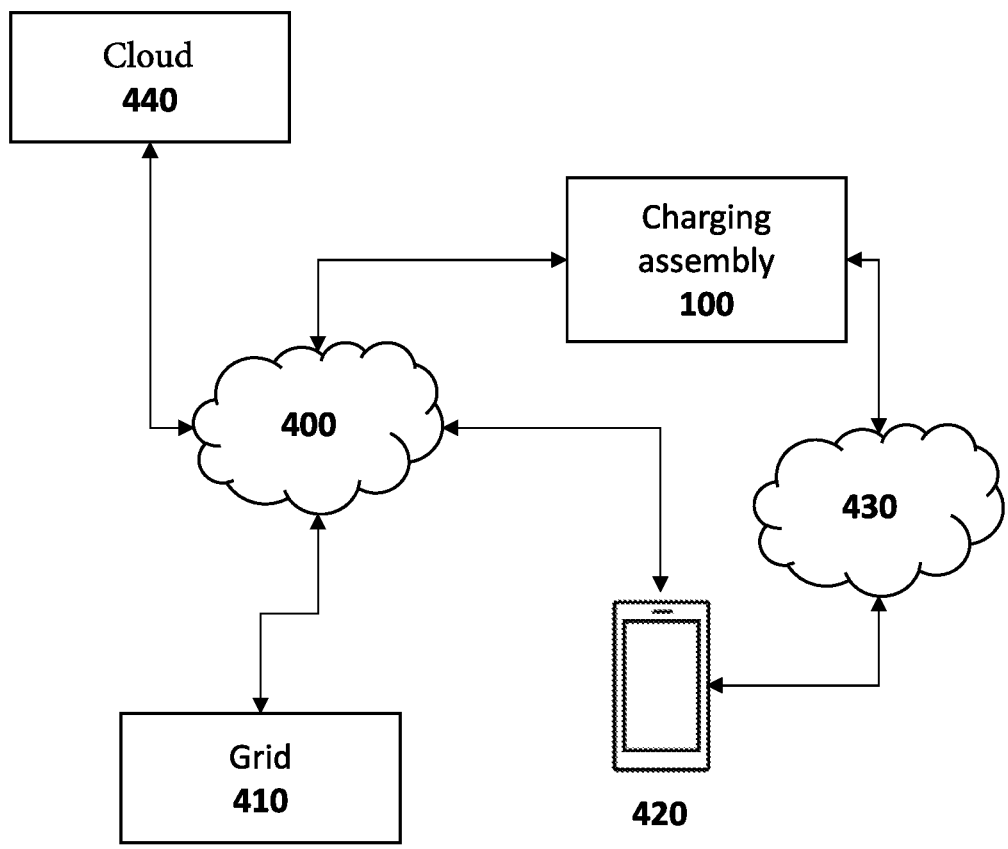
FIG. 4 is an environmental diagram showing the charging assembly, cloud, user device, and grid connected through networks, according to an exemplary embodiment of the present invention.

Referring to FIG. 4 which shows the disclosed charging assembly 100 connected to a cloud 400, wherein the cloud can be connected to one or more power grids 440, a grid 410, and a user device 420 through the network 400. The cloud 440 can also connect to grid 410 and the user device 420. The network 400 can be an external network known to a skilled person for connected computing devices and includes the internet. It is to be understood that FIG. 4 shows a single network 400 connecting different entities, however, the entities may connect over different networks, for example, the charging assembly may connect to the cloud through a first network and connects to the user device over a second network. The charging assembly 100 can also connect to the user device 420 over a network 430. Network 430 can be a local network created by the charging assembly.

The housing encloses a charging circuitry that can be connected to a transformer for receiving power from one or more grids. The charging circuitry can provide for charging the batteries of electric vehicles, for example, the charging circuitry can provide for level 1 and level 2 charging. The charging circuitry may also include any safety features known to a skilled person for safely charging an electric vehicle and preventing any accidental shocks to the users. The charging circuitry can be connected to a charging cord which is having a plug at its other end. Any type of charging cord and plug known for charging electric vehicles can be used without departing from the scope of the present invention. Moreover, interchangeable plugs can also be provided to suit different makes of electric vehicles. For example, a standard EVSE plug with an adapter that fit cars like a tesla high power connector can be provided.

The cord can be suspended from the housing mounted on the utility pole, as shown in FIG. 3. The cord can be connected to the charging circuitry through a plug that can be separated by a mechanical shock, thus protecting the charging assembly. To charge the electric vehicle, a user can simply plug the cord into the charging point of the electric vehicle. FIG. 3 shows the cord 120 suspended in the air from the housing 110 and the cord having the plug 130. The plug 130 can be seen connected to the electric vehicle at its charging point. Alternatively, the cord can be spooled through the utility pole. As shown in FIG. 2, a panel 210 can be mounted on the bottom portion of the utility pole 200 through which the cord 120 can extend out. The cord can be extended from the panel for charging and retracted back after the charging is completed. Panel 210 can be locked when the assembly is not in use and the cord is retracted into the panel. The charging assembly can also include a motorized reel cord that allows extending and retracting of the electric cord. Include a motorized reel for the electric cord. For charging the electric vehicle, a user can pull the electric cord, wherein the motorized reel permits unwinding of the reel for the release of the electric cord. Upon completion of the charging, the motorized reel can retract the charging cord.

The panel may include an input member for receiving an unlock command. For example, a keypad can be seen in FIG. 3 above panel 210. A predetermined combination of numbers can be input into the keypad for unlocking the panel and extending the cord. Alternatively, the panel can be remotely unlocked, for example through the app on the user device. The panel can be connected to a control unit that can be enclosed in the housing. The control unit can be operably connected to different components of the charging assembly.

The control unit can include a networking circuitry that allows connecting to user devices. A user device can be a smartphone, a tablet computer, an onboard computing system of an electric vehicle, a laptop, and the like. An interface can be provided on the user device that allows a user to interact with disclosed charging assembly for charging the electric vehicle and payment. The interface can be provided as application software (app) that can be installed on a user device. The application software can be developed for Android, iOS, Windows, and any other known operating platform for mobile devices. The application software can be made available through a distribution service provider, for example, Google Play operated and developed by Google and the app store by Apple. In addition to the application software, a website-based interface can also be provided through the world-wide-web.

The network circuitry may allow connecting the user device to the control circuit. Preferably, the user device can wirelessly connect with the control unit on a wide area network, such as the internet or wireless local area network. The networking circuitry can connect to available networks, such as cellular networks including AMPS, GSM, GPRS, UMTS, LTE, LTE Advanced, Mobile WiMAX, and WiMAX-Advanced. As shown in FIG. 4, the charging circuitry 100 can be connected to a cloud and user device through a network. Internet may not be available everywhere, thus network circuitry may also provide for connecting to the user device without internet. For example, the network circuitry may create a wireless local area network or any similar network over which the user device can interact with the charging assembly. In one case, the application software on the user device can detect and connect to the WLAN. In one case, a user can scan a QR code on the utility pole or the panel for connecting to the WLAN. Similarly, the user may also connect through NFC, USSD ((Unstructured Supplementary Service Data) connection, and like networks.

The interface can provide different options to start and end the charging. The interface can also have a meter showing the amount of charge transferred and cost. The interface may also provide invoices and receive payments. The interface may also allow verifying a user device and storing payment information. The interface may also provide a random code that may be entered in the keypad for unlocking the panel. Alternatively, panel 210 can automatically open once the user device connects to the charging assembly. Alternatively, the interface may have a control button clicking on which unlocks the panel. The instruction to unlock the panel can also be provided through NFC, wherein the user device can make a tap on the panel.

The charging assembly can also include a beacon coupled on top of the housing or on the top portion of the utility pole on which the charging assembly is mounted. The beacon can have a contrasting color that allows locating the charging assembly from a long distance. For example, the beacon can have a bright red light that can be seen from a distance. For example, a user on a highway can know the presence of the charging assembly from a distance through the beacon. The beacon can switch to a different color when the charging assembly is engaged i.e., charging the electric vehicle. For example, the color of the beacon can change from red to green. Additionally, the beacon can show a different signal, such as blink in green color when the charging is almost complete. Different states of the beacon may allow a user to know the status of the charging assembly from a distance.

A display panel can be provided in the housing that may show information related to the charging, such as voltage. The series of indicators below the display panel can show the progress of the charging. A dome-shaped camera can also be provided for safety and recording the transactions including the vehicle that is charged.

The control unit of the disclosed charging assembly can be programmed for load balancing. The control unit and the charging circuitry can determine the load and available voltage from the grid and accordingly adjust the charging voltage. Additionally, the control unit can be programmed with peak hours timings during which the charging assembly may be switched to standby or operate Undervoltage. The control unit can also receive electric usage of a neighborhood to avoid destabilizing the grid supply.

As shown in FIG. 4, a cloud can be connected to a central unit and one or more above-explained functions of the control unit can be performed on the cloud. The cloud can connect to the grid power supply 420 for analyzing electric usage, such as peak energy demands and duration when energy demand is less. The cloud can present on the user device through the disclosed interface the location of the charging assemblies. The interface may also provide navigation details to the user. The interface may also provide waiting time, charging cost, etc. to the user. The cloud can provide for load balancing by turning the charging assemblies in active and standby modes. The cloud through the user interface can show the active charging assemblies. The cloud can analyze the electric usage in the neighborhood of a charging assembly. In case, an electric supply to a charging assembly becomes overloaded, the cloud through the interface can recommend another nearby charging station (MEAC). The cloud may also allow the user devices to communicate i.e., App to App communication for priority charging (2 or more cars that communicate with each other for priority charging over the App). In one case, the App can be voice-controlled.

In one case, the charging assembly can move up and down on the utility pole. When not in use, the charging assembly can move up on the pole. For charging, a user can press a button on the pole bringing the charging assembly down within reach of the user. The user interface may also provide an option for adjusting the charging assembly up and down. A lift mechanism can be provided on the pole that allows the housing to move up and down. The lifting mechanism can connect to the button and/or the control unit of the charging assembly.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A charging assembly comprising:
   a lift mechanism configured to couple to a utility pole;
   a housing coupled to the lift mechanism, the housing has a top, a left side, a right side, a bottom, a rear, and a front, wherein the lift mechanism configured to move the housing up and down relative to the utility pole;
   a charging circuitry in the housing and configured to electrically connect to a power supply;
   an electric cord connected at one end to the charging circuitry and an another end of the electric cord connected to a plug, the plug configured to connect to a charging port of an electric vehicle;
   a control unit enclosed in the housing and operably coupled to the charging circuitry; and
   a network circuitry coupled to the control unit and configured to create a wireless local area network or connect to an external network.

2. The charging assembly according to claim 1, wherein charging assembly further comprises a button mounted on the utility pole and operably coupled to the lifting mechanism, wherein the charging assembly is moved downwards on pressing the button for charging of an electric vehicle, wherein the charging assembly is configured to move upwards upon completion of the charging.

3. The charging assembly according to claim 1, wherein a control button is provided on an interface on a user device, wherein the charging assembly is moved downwards on clicking the control button for charging of an electric vehicle, wherein the charging assembly is configured to move upwards upon completion of the charging.

4. A utility pole for street lightening comprising:
- a lift mechanism configured to couple to the utility pole;
- a housing coupled to the lift mechanism, the housing has a top, a left side, a right side, a bottom, a rear, and a front, wherein the lift mechanism configured to move the housing up and down relative to the utility pole;
- a charging circuitry in the housing and configured to electrically connect to a power supply;
- an electric cord connected at one end to the charging circuitry and an another end of the electric cord connected to a plug, the plug configured to connect to a charging port of an electric vehicle;
- a control unit enclosed in the housing and operably coupled to the charging circuitry; and
- a network circuitry coupled to the control unit and configured to create a wireless local area network or connect to an external network.

* * * * *